No. 768,618. PATENTED AUG. 30, 1904.
H. F. NEUMEYER.
LAWN SPRINKLER.
APPLICATION FILED DEC. 26, 1903.
NO MODEL.

Horace F. Neumeyer, Inventor

Witnesses
Louis C. Starke
B. G. Foster

By
C. G. Siggers
Attorney

No. 768,618. Patented August 30, 1904.

UNITED STATES PATENT OFFICE.

HORACE FALK NEUMEYER, OF MACUNGIE, PENNSYLVANIA.

LAWN-SPRINKLER.

SPECIFICATION forming part of Letters Patent No. 768,618, dated August 30, 1904.

Application filed December 26, 1903. Serial No. 186,568. (No model.)

*To all whom it may concern:*

Be it known that I, HORACE FALK NEUMEYER, a citizen of the United States, residing at Macungie, in the county of Lehigh and State of Pennsylvania, have invented a new and useful Lawn-Sprinkler, of which the following is a specification.

This invention relates to that class of sprinklers which are intended to be coupled to the end of an ordinary garden-hose and placed upon a lawn for the purpose of watering the same.

More particularly, the invention relates to sprinklers including in their make-up rotary spraying-wheels which are operated by and operate upon streams of water issuing from the bodies of the sprinklers. In this class of devices the action of the wheel upon the water has been very unsatisfactory, for the reason that a uniform body of spray thrown entirely over the field of action from the sprayer to the outermost limit has not been attainable. In this present invention the objection has been entirely obviated by a simple structure and combination of elements which can be manufactured at small cost and is adjustable to the pressure and volume of the water discharged.

The preferred embodiment of the invention is illustrated in the accompanying drawings, wherein—

Figure 1:
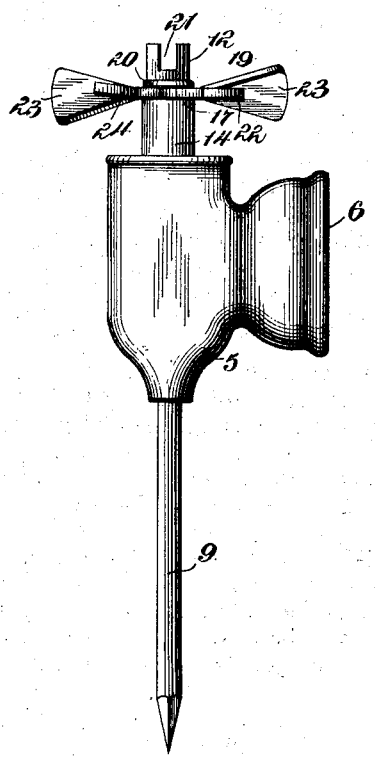
Figure 2:
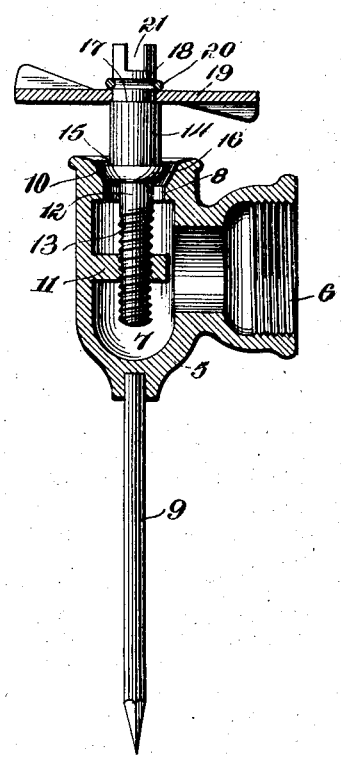
Figure 3:
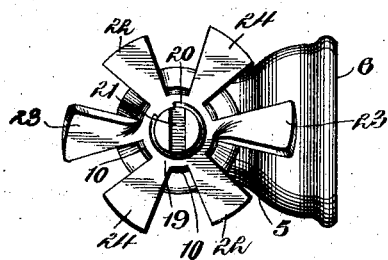
Figure 4:
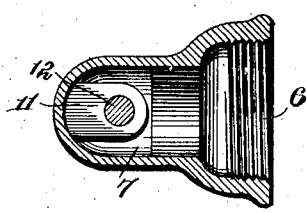

Figure 1 is a side elevation of the sprinkler. Fig. 2 is a vertical sectional view through the same. Fig. 3 is a top plan view, and Fig. 4 is a horizontal sectional view.

Similar reference-numerals indicate corresponding parts in all the figures of the drawings.

In the illustrated structure a body 5 is employed, having an internally-threaded coupling-boss 6, an interior chamber 7, and an upwardly-extending discharge-outlet 8. Depending from the body is a suitably-sharpened pin 9, which is adapted to be forced into the sod or earth upon the lawn for the purpose of supporting the body in upright position. The outlet 8 has its outer portion flared, as shown at 10, and the body 5 is provided with an inwardly-extending ear 11, located midway between the top and bottom of the chamber 7, said ear being disposed in line with the outlet.

A stem 12 passes centrally and longitudinally through the outlet and has its lower end threaded, as shown at 13, said end being adjustably screwed in the ear 11. The upper portion of the stem has an enlargement 14, and the lower end of said enlargement is in the form of a flange 15, having its lower face convexed, as shown at 16, said convexed face being located in opposition to the discharge-outlet. The upper end of the enlargement 14 forms an annular flat shoulder 17, and a groove 18 is formed in the stem above the shoulder. A spraying-wheel 19 is journaled upon the upper end of the stem between the groove and shoulder and normally rests upon the latter. This spraying-wheel is detachably held in place by means of a split spring-ring 20, that is seated in the groove. The upper end of the stem is preferably slotted, as shown at 21, to receive a screw-driver or other suitable operating-tool.

It is desired to call attention to the structure of the wheel. It will be noted by reference to Fig. 3 that certain of the vanes are of different lengths. For instance, those designated 22 are the shortest, while 23 are the longest, there also being an intermediate pair 24. The vanes that are of equal length are disposed directly opposite each other, so that the wheel as a whole will be properly balanced. It is also to be noted that all of the vanes are not inclined. The longest—namely, 23—are disposed at any desired inclination, being turned or twisted substantially on their longitudinal axes and really constitute the driving-vanes for the wheel. The intermediate vanes 24 are preferably slightly inclined; but the shorter vanes are entirely flat, or, in other words, their faces are in planes at substantially right angles to the vertical plane of the axis of the wheel. All, however, project into and across the path of water discharged from the outlet.

By careful experiment it has been found that this disposition and arrangement of parts secures a uniform finely-divided spray on every side of the sprinkler and that said spray is projected uniformly outward to the edge of the field of action of said sprinkler. Thus the lawn within the field of action can be completely and thoroughly sprinkled, leaving no part untouched. This beneficial result can be attributed partially to the manner in which the water is directed to the vanes and partially to the relation of said vanes with respect to the water striking the same and to each other. If desired, the wheel can be removed, whereupon the sprayer will project a symmetrical cone of water. With the wheel in place, however, this cone is intercepted thereby and is thrown in various directions by the differently-disposed vanes. It will of course be understood that by screwing the stem into and out of the body the lower end of the enlargement will be moved toward or from the outlet, and thereby the force and volume of water can be controlled.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a sprinkler, the combination with a body having an outwardly-flared fluid-outlet, of a stem passing through the outlet and having an enlargement in line with and movable into and out of the outlet, the face of said enlargement that is opposed to the outlet being convexed, and a sprayer-wheel journaled on the stem and having vanes that are in line with the annular space formed between the walls of the outlet and the convexed face of the enlargement, said vanes thereby intersecting the flow of water discharged from the outlet.

2. In a sprinkler, the combination with a body having a fluid-discharge, of a freely revoluble sprayer-wheel journaled over the discharge and having radially-disposed vanes located at different angles of inclination, said inclined vanes being turned substantially on their longitudinal axes and extending transversely of the flow of water from the said fluid-discharge.

3. In a sprinkler, the combination with a body having an outwardly-flared fluid-outlet, of a stem passing centrally through the outlet and adjustably threaded into the interior of the body, a convexed enlargement on the stem in line with the outlet, and a freely-revoluble sprayer-wheel journaled on the outer end of the stem and having an annular series of radially-disposed vanes, said vanes extending into the path of the stream from the outlet being of different lengths and twisted upon their longitudinal axes at different degrees of inclination.

In testimony that I claim the foregoing as my own I have hereto affixed my signature in the presence of two witnesses.

HORACE FALK NEUMEYER.

Witnesses:
    J. WATTE SINGMASTER,
    D. J. NAGLE.